United States Patent Office 3,048,572
Patented Aug. 7, 1962

---

3,048,572
POLYMERIZATION OF ALPHA-BETA-UNSATURATED MONOMERS
Frank Joseph Welch, Charleston, W. Va., assignor to Union Carbide Corporation, a corporation of New York
No Drawing. Filed Sept. 11, 1959, Ser. No. 839,279
9 Claims. (Cl. 260—88.7)

The present invention relates to organic processes, and more particularly, to novel and improved processes for polymerizing alpha,beta-unsaturated monomers.

Alpha,beta-unsaturated monomers, such as methyl methacrylate, ethyl acrylate, acrylonitrile and the like, have heretofore been polymerized by many methods, among which, there may be mentioned anionic polymerizations involving the use as a catalyst of sodium naphthalene or potassium amide in liquid ammonia. In these conventional anionic polymerizations, the reactions are ordinarily carried out at low temperatures, e.g. between about —80° C. and —33° C., if relatively high molecular weight polymers are to be obtained. Thus, in such processes, the use of complex and costly equipment capable of producing and maintaining these low temperatures in the reaction system is unfortunately necessitated. Another disadvantage encountered therein lies in the reactivity of ammonia with esters such as the alkyl acrylates and methacrylates to form acrylamides and methacrylamides, respectively. As a consequence of this reactivity the polymeric materials obtained by the polymerization of alkyl acrylates or methacrylates contain numerous amide groups in the polymer chain.

These disadvantages can now be overcome through the practice of this invention which, in its broadest aspect, is directed to processes for polymerizing alpha,beta-unsaturated monomers, as hereinafter described, in contact with a catalytic amount of an alkaline earth metal amide catalyst. The polymerization can be carried out as a bulk process, but preferably is carried out in the presence of an inert organic diluent which does not participate in or interfere with the reaction.

Performed in accordance with this invention, the polymerization of the alpha,beta-unsaturated monomers can be conducted efficiently at temperatures of up to about 150° C. or somewhat higher, thereby obviating the disadvantage of low temperature operation. Moreover, the polymeric products obtained in accordance with this invention are ordinarily solid products which possess a molecular weight appreciably in excess of that possessed by the polymeric products produced by the conventional anionic polymerizations hereinabove described.

By the term "reduced viscosity," as used herein including the appended claims, is meant a value obtained by dividing the specific viscosity of a solution of the polymer by the concentration of the polymer in the solution, the concentration being measured in grams of polymer per 100 milliliters of solvent at a given temperature, and it is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, at a temperature of 30° C.

The alpha,beta-unsaturated monomers contemplated by this invention can be defined more clearly by representation in connection with the following general formula:

$$CH_2=C\begin{matrix}A\\|\\B\end{matrix}$$

wherein A designates a member of the class consisting of hydrogen and halogen atoms and the alkyl radicals containing from 1 to about 4 carbon atoms and preferably from 1 to about 2 carbon atoms, and B designates a member of the class consisting of the —CN,

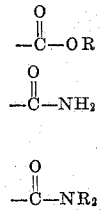

radicals wherein R designates an alkyl radical containing from 1 to about 12 carbon atoms and preferably from 1 to about 4 carbon atoms. The alkyl radicals hereinabove described can also be substituted by groups which are inert during the practice of this invention, such as lower alkyl ether, lower alkyl ester, amide, nitrile, halogen substituents and the like.

Illustrative of the alpha,beta-unsaturated monomers which are suitable for use in the processes of this invention there can be mentioned the following: ethyl acrylate, N,N-diethylaminoethyl acrylate, cyanoethyl acrylate, decyl acrylate, acrylonitrile, acrylamide, dimethylacrylamide, methyl methacrylate, 2-ethylhexyl methacrylate, butyl alpha-chloroacrylate and the like. In addition, mixtures of the above monomers can also be employed.

The catalysts contemplated by this invention are the divalent alkaline earth metal amide catalysts, the metal portion of which has an atomic number of at least 4, preferably at least 12, and not more than 56, and is found in group IIA of the periodic chart of the elements as illustrated in the Handbook of Chemistry, 8th edition 1952, page 56, published by the Handbook Publishing Co., Sandusky, Ohio. More particularly, these alkaline earth metal amide catalysts can be represented by the general formula

$$H_2N—M—NH_2$$

wherein M is beryllium, magnesium, calcium, barium or strontium. Of these, the amides of magnesium, strontium and calcium have been found to engender particularly good results as catalysts.

The preparation of the alkaline earth metal amides is well known to the art. By way of illustration, the metal hexammoniates can be prepared by reacting the appropriate metal with liquid ammonia, the resulting product being characterized by the formula

$$M(NH_3)_6$$

wherein M can be calcium, strontium, barium, and the like. The alkaline earth metal amides can then be obtained by allowing the corresponding metal hexammoniate to decompose while protecting them from reactive gases and/or vapors such as oxygen, water, and the like. The amides of beryllium and magnesium can also be prepared for example by the reaction of diethylberyllium or diethylmagnesium with ammonia. In addition, the articles of Bergstrom and Fernelium[1] also disclose various methods for preparing these metal amides.

The catalytic activity of the alkaline earth metal amides is quickly destroyed upon exposure to air. The preparation and storage of the catalyst should be conducted under conditions in which water, oxygen, and other gases and/or vapors reactive with the metal, or the amides, are essentially excluded. Operations subsequent to the catalyst preparation should be carried out under an inert atmosphere free of gases which are reactive with the metal amides, e.g., in high purity nitrogen atmosphere. Many

---

[1] Chem. Revs., 12, 43 (1933); Chem. Revs., 20, 413 (1937).

operations can be desirably carried out by suspending the catalyst in an inert liquid such as the inert organic diluents herein described.

The concentration of the alkaline earth metal amide to be employed as a catalyst in accordance with this invention can vary over a broad range. In general, a catalyst concentration in the range of from about 0.02 percent to about 10 percent by weight, based upon the weight of total monomeric feed, is preferred. However, higher or lower catalytically significant quantities of the alkaline earth metal amide can also be employed, such quantities being readily determinable by those skilled in the art in light of this disclosure. For optimum results, the particular catalyst employed, its preparation, its surface area, the nature of the monomeric reactant(s), the temperature at which the polymerization reaction is conducted, and other factors will largely determine the desired catalyst concentration. For instance, with the very finely divided active catalysts, catalyst concentrations in the range of from 0.02 to 0.1 percent by weight of the monomeric feed may be employed, accompanied by a high degree of catalytic efficiency.

The preferred inert organic diluents for use in this invention are those which are solvents for the monomeric reactant(s). It is to be noted, however, that this invention is also applicable to suspensions of the monomeric reactant(s) in an inert organic diluent. The diluent can also be a solvent for the polymer produced although this is not necessary. Among the suitable inert organic diluents there may be mentioned for example, the aromatic hydrocarbons, such as benzene, toluene, xylene, ethylbenzene, t-butylbenzene and the like. Also suitable are the saturated aliphatic and cycloaliphatic hydrocarbons, such as n-hexane, octane, cyclohexane and the like. Aliphatic and cyclic ethers can also be used as the inert organic diluent. Typical of these are tetrahydrofuran, diethylether, dioxane, dibutylether, anisole, tetrahydropyran and the like. In addition, combinations of the above-mentioned diluents can also be employed. Alternatively, the polymerization reaction can be carried out in the absence of a diluent.

The monomeric reactant(s) and diluent(s) should be free of substances which destroy the catalytic effect of the catalyst, as, for example, such impurities as water, oxygen, carbon monoxide, alcohols and the like. Thus, the polymerizations are generally carried out in dry equipment, using anhydrous monomeric reactant(s) and under an inert gas atmosphere, such as an atmosphere of helium, argon, methane, nitrogen and the like.

The polymerization reaction can be carried out over a wide temperature range. Depending upon various factors, such as the nature of the monomeric reactant(s) employed, the particular catalyst employed, the inert organic diluent employed, the concentration and surface area of the catalyst and the like, the reaction temperature can be as low as about −20° C. and as high as about +150° C. A preferred temperature range is from about 0° C. to 120° C. Reaction temperatures somewhat below or above the broad temperature range described above can also be employed. However, the rate of polymerization rapidly decreases below about −20° C., while at temperatures above about 120° C., and particularly above about 150° C., thermal polymerization rather than catalyzed polymerization appears to be the predominant reaction.

The polymerization reaction can be carried out, for example, by adding a suspension of the catalyst in an inert organic diluent to the bulk monomeric reactant(s) or to a solution or suspension of the monomeric reactant(s) in an inert organic diluent at the desired polymerization temperature, and allowing the mixture to stand until the polymerization is completed. An alternative procedure is to add the monomeric reactant(s) to a suspension of the catalyst in an inert organic diluent at the desired polymerization temperature and at the same rate that it is being polymerized.

In general, the reaction time will vary depending upon the operating temperature, the nature of the monomeric reactant(s) employed, the particular catalyst employed, the inert organic diluent employed, the concentration and surface area of the catalyst and the like. The reaction time can be as short as minutes in duration or it can be as long as several days.

Upon completion of the polymerization reaction, the normally solid polymeric products of this invention can be recovered by filtration, or by precipitation with a non-solvent followed by filtration, and are then generally washed with acidified methanol and dried. Other recovery techniques will occur to those skilled in the art and can also be employed in accordance with this invention. The following examples further serve to illustrate the invention.

EXAMPLE I

A solution of 20 grams of methyl methacrylate in 230 milliliters of hexane was placed in a dry bottle and purged with nitrogen. A suspension of 1.0 gram of calcium amide in 20 milliliters of heptane was added, and the bottle was capped. The bottle was rotated end over end in a water bath at a temperature of 50° C. for a period of 18 hours. The solid polymer product thereby formed was removed by filtration and washed with methanol containing about 2 percent concentrated hydrochloric acid. After additional washing with methanol, the polymer product was dried. In this manner, one gram of poly(methyl methacrylate) was obtained. The polymer product had a reduced viscosity in benzene of 1.66.

EXAMPLE II

Using the procedure described in Example I for charging the polymerization bottles and recovering the polymer product, a series of experiments illustrating the use of various monomers and solvents was carried out. Operating conditions and the resulting data obtained from this series of experiments is tabulated below in Table A. In all of the experiments, 2 grams of calcium amide was used as catalyst. In run nos. 1 to 3, the reduced viscosity of the polymer product was obtained from a benzene solution; in run No. 4, a dimethylformamide solution of the polymer product was used for this purpose.

*Table A*

| Run No. | Monomer | | Diluent | | Reaction | | Percent Yield | Reduced Viscosity |
|---|---|---|---|---|---|---|---|---|
| | Name | Amount (Grams) | Name | Amount (Milliliters) | Temp. (° C.) | Time (Hours) | | |
| 1 | methyl methacrylate. | 30 | tetrahydrofuran | 150 | 50 | 18 | 33 | 1.67 |
| 2 | ____do____ | 30 | acetonitrile | 150 | 50 | 18 | 33 | 0.50 |
| 3 | ethylacrylate | 30 | hexane | 150 | 27 | 17 | 100 | 2.76 |
| 4 | acrylonitrile | 25 | ____do____ | 200 | 50 | 17 | 16 | 0.96 |

EXAMPLE III

Using the procedure described in Example I, a bottle was charged with 200 milliliters of hexane, 25 grams of acrylonitrile and 2 grams of strontium amide. The polymerization was carried out at a temperature of 50° C. for a period of 17 hours, whereupon one gram of poly(acrylonitrile) was recovered as a product. The polymer product had a reduced viscosity in dimethylformamide of 0.36.

EXAMPLE IV

To 30 grams of acrylonitrile, contained in a polymerization tube there was added 1 gram of magnesium amide suspended in 10 milliliters of heptane. Air was removed from the tube by purging with nitrogen. The tube was capped and rotated end over end in a water bath at a temperature of 50° C. for a period of 16 hours. The polymer product obtained in this manner was then recovered and purified as described in Example I, whereupon 21 grams of poly(acrylonitrile) was obtained. The polymer product had a reduced viscosity in dimethylformamide of 0.32.

EXAMPLE V

Thirty milliliters (volumetric measure at a temperature of 25° C.) of methyl methacrylate was placed in a polymerization tube and cooled under a nitrogen atmosphere maintained at a temperature below —30° C. A suspension of 0.25 gram of calcium amide in 5 milliliters of heptane was added thereto and the tube was capped. The tube was rocked in a bath at a temperature of —8° C., for a period of two hours. The polymer product obtained in this manner was recovered and purified as described in Example I, whereupon 23 grams of poly(methyl methacrylate) was obtained. The polymer product had a reduced viscosity in benzene of 2.86.

EXAMPLE VI

A mixture of 100 milliliters (volumetric measure at a temperature of 25° C.) of toluene, 30 grams of methyl methacrylate and 2 grams of calcium amide was placed in a dry 500 milliliter flask fitted with a stirrer and reflux condenser. The mixture was stirred at reflux at a temperature of 110° C. and under a nitrogen atomsphere for a period of four hours. The polymer product obtained in this manner was recovered and purified as described in Example I, whereupon 4 grams of poly(methyl methacrylate) was obtained. The polymer product had a reduced viscosity in benzene of 2.20.

What is claimed is:

1. A process for polymerizing an alpha,beta-unsaturated monomer represented by the general formula:

wherein A designates a member of the class consisting of hydrogen and halogen atoms and the alkyl radicals containing from 1 to 4 carbon atoms, and B designates a member of the class consisting of the —CN,

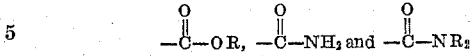

radicals wherein R designates an alkyl radical containing from 1 to 4 carbon atoms, which process comprises contacting said monomer at a temperature of from about —20° C. to about 150° C., in the presence of an inert organic diluent, with a catalytic amount, sufficient to catalyze said polymerization, of an inorganic alkaline earth metal amide of the formula $H_2N-M-NH_2$ wherein M is an alkaline earth metal atom having an atomic number of from 4 to 56, for a period of time sufficient to polymerize the monomer.

2. A process for the polymerization of acrylonitrile which comprises contacting acrylonitrile at a temperature of from about —20° C. to about 150° C. in the presence of an inert organic diluent, with a catalytic amount, sufficient to catalyze said polymerization, of an inorganic alkaline earth metal amide of the formula $H_2N-M-NH_2$ wherein M is an alkaline earth metal atom having an atomic number of from 4 to 56, for a period of time sufficient to produce poly(acrylonitrile).

3. The process of claim 2 wherein said alkaline earth metal amide is calcium amide.

4. The process of claim 2 wherein said alkaline earth metal amide is strontium amide.

5. The process of claim 2 wherein said alkaline earth metal amide is magnesium amide.

6. A process for the polymerization of methyl methacrylate which comprises contacting methyl methacrylate at a temperature of from about —20° C. to about 150° C. in the presence of an inert organic diluent, with a catalytic amount, sufficient to catalyze said polymerization of an inorganic alkaline earth metal amide of the formula $H_2N-M-NH_2$ wherein M is an alkaline earth metal atom having an atomic number of from 4 to 56, for a period of time sufficient to produce poly(methyl methacrylate).

7. The process of claim 6 wherein said alkaline earth metal amide is calcium amide.

8. The process of claim 6 wherein said alkaline earth metal amide is strontium amide.

9. The process of claim 6 wherein said alkaline earth metal amide is magnesium amide.

References Cited in the file of this patent

UNITED STATES PATENTS 2,608,555   Bullitt _____ Aug. 26, 1952